United States Patent
Park et al.

(10) Patent No.: US 11,351,881 B1
(45) Date of Patent: Jun. 7, 2022

(54) MULTI-FUNCTIONAL MULTI-RATIO OBC/LDC INTEGRATED CIRCUIT

(71) Applicant: INDUSTRY-ACADEMIC COOPERATION FOUNDATION, YONSEI UNIVERSITY, Seoul (KR)

(72) Inventors: Jungwook Park, Seoul (KR); Issac Kim, Suwon-si (KR); Sunho Lee, Uiwang-si (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 17/146,374

(22) Filed: Jan. 11, 2021

(51) Int. Cl.
| | |
|---|---|
| *B60L 53/60* | (2019.01) |
| *B60L 53/20* | (2019.01) |
| *B60L 50/60* | (2019.01) |
| *B60L 55/00* | (2019.01) |
| *H02M 3/335* | (2006.01) |

(52) U.S. Cl.
CPC .............. *B60L 53/60* (2019.02); *B60L 50/60* (2019.02); *B60L 53/20* (2019.02); *B60L 55/00* (2019.02); *H02M 3/33584* (2013.01); *B60L 2210/10* (2013.01); *H02J 2207/20* (2020.01); *H02J 2310/48* (2020.01); *Y02T 10/7072* (2013.01); *Y02T 10/92* (2013.01)

(58) Field of Classification Search
CPC ..... Y02T 10/7072; Y02T 10/72; Y02T 90/14; Y02T 10/92; B60L 2210/10; B60L 53/22; B60L 58/20; B60L 53/14; B60L 53/20; B60L 55/00; H02M 3/33584; H02M 3/33592; H02J 2310/48; H02J 2207/20; H02J 7/02; H02J 3/322; Y04S 10/126
See application file for complete search history.

(56) References Cited

U.S. PATENT DOCUMENTS

2019/0148973 A1* 5/2019 Kim .................. H02M 3/33584
                                                                320/109

FOREIGN PATENT DOCUMENTS

| KR | 101903121 B1 | 12/2017 |
|---|---|---|
| KR | 101959922 B1 | 3/2018 |

OTHER PUBLICATIONS

Kim, Issac, Sunho Lee, and Jung-Wook Park. "Design and Control of OBC-LDC Integrated Circuit with Variable Turns Ratio for Electric Vehicles." 2020 IEEE Energy Conversion Congress and Exposition (ECCE). IEEE, Oct. 2020. (Year: 2020).*

Kim, Dong-Hee, Min-Jung Kim, and Byoung-Kuk Lee. "An integrated battery charger with high power density and efficiency for electric vehicles." IEEE Transactions on Power Electronics 32.6 (2016): 4553-4565. (Year: 2016).*

(Continued)

*Primary Examiner* — Ryan Johnson

(57) ABSTRACT

The present disclosure relates to a multi-functional multi-ratio OBC/LDC integrated circuit that is capable of bidirectional operation over a broad voltage rage with a high power density and without additional control in a battery charging system for an electric vehicle. As the turns ratio can be used selectively, the G2V and V2G functions can be performed bidirectionally over a broad voltage range without additional control, and the LDC function can be operated by using only a small number of switches, so that the efficiency of the charging control can be increased.

13 Claims, 8 Drawing Sheets

(56) References Cited

OTHER PUBLICATIONS

Nguyen, Hoang Vu, Dinh-Du To, and Dong-Choon Lee. "Onboard battery chargers for plug-in electric vehicles with dual functional circuit for low-voltage battery charging and active power decoupling." IEEE Access 6 (2018): 70212-70222. (Year: 2018).*

Kim, Seonghye, and Feel-Soon Kang. "Multifunctional onboard battery charger for plug-in electric vehicles." IEEE Transactions on Industrial Electronics 62.6 (2014): 3460-3472. (Year: 2014).*

* cited by examiner

MULTI-FUNCTIONAL MULTI-RATIO OBC/LDC INTEGRATED CIRCUIT

BACKGROUND

1. Technical Field

The present disclosure relates to a battery charging system for an electric vehicle, more particularly to a multi-functional multi-ratio OBC/LDC integrated circuit that is capable of bidirectional operation over a broad voltage rage with a high power density and without additional control.

2. Description of the Related Art

An electric vehicle is a vehicle that uses electrical energy instead of conventional fossil fuels, and recent times have seen rapid developments in fields related to the electric vehicle, as fossil fuels become depleted and development trends focus on environment-friendly vehicles.

Since an electric vehicle uses electricity as its energy source, it is necessary to store and contain electricity, which may be achieved by charging a battery with a general commercial power grid.

Here, the circuit used for charging an electric vehicle's battery, i.e. the energy storage device, with the high voltage of the commercial power grid is the OBC (on-board charger) circuit, the charger circuit for an electric vehicle.

FIG. 1A and FIG. 1B are a block diagram and a circuit diagram illustrating the composition of a general OBC.

The structure of an OBC circuit may include a PFC (power factor corrector) 10, a DC/DC 11, and a HVB 12.

The OBC circuit, also known as a slow-charging circuit or a vehicle-mounted battery charger, converts the alternating current of the commercial power grid to a direct current for charging a battery. Here, the voltage charging the battery is a high voltage of a direct current supplied to the motor for driving the electric vehicle.

FIG. 2A and FIG. 2B are a block diagram and a circuit diagram illustrating the composition of a general LDC.

The structure of an LDC circuit may include a HVB 20, a DC/DC 21, and a LVB 22.

The LDC (low-voltage DC-DC converter) circuit, which is a circuit for power conversion and which is used as an auxiliary batter charger, is a circuit that converts a high voltage to a low voltage and may convert the high-voltage direct current outputted from the OBC circuit for use in driving the motor to a low voltage of 12V or 24V, thereby supplying the low voltage of 12V or 24V used by the peripheral equipment of the vehicle.

Thus, an on-board charger (OBC) may operate by raising the power factor of the power from the grid by way of a power factor corrector circuit and then convert this output voltage from the circuit to a level suitable for a high-voltage battery by way of a DC/DC converter.

The auxiliary battery charger (LDC) may operate by lowering the high voltage of the high-voltage battery to the low voltage of the auxiliary battery through a DC/DC converter.

A battery charging system mainly used in the related art may charge the high-voltage battery with the OBC and charge the auxiliary battery with the LDC using the high-voltage battery as the input.

That is, the battery charging system may be composed of two circuits.

Such a composition entails an increased number of switches and components, so that the charging system is burdened with a large volume.

While an integrated type circuit that integrates the OBC and the LDC has been developed to resolve the problem above, this type of circuit may provide a low efficiency during operation as an LDC and may require additional control to operate bidirectionally over a broad voltage range.

FIG. 3 is a circuit diagram illustrating an OBC/LDC integrated circuit according to the related art.

In a battery charging system having an OBC/LDC integrated circuit based on the related art, the switch M may be operated according to the selected mode (connecting to "b" for the G2V and V2G functions and connecting to "a" for the LDC function), and several functions may be performed in each mode through the switching operations of $S_1 \sim S_{12}$.

In an OBC/LDC integrated circuit, the grid-to-vehicle (G2V) function, which charges the high-voltage battery from the grid, the vehicle-to-grid (V2G) function, which transmits power from the high-voltage battery to the grid, and the low-voltage DC/DC converter (LDC) function, which charges the low-voltage battery from the high-voltage battery, may be performed with a single circuit.

Compared to a circuit in which the OBC and the LDC are separated, an integrated circuit of the related art such as that illustrated above provides the advantage that the numbers of switches and components can be reduced, since the LDC function can be performed with just the existing OBC circuit without having to add the LDC portion.

However, when operating as an LDC, all twelve switches are operated, so that the efficiency is low, and there is still the disadvantage that bidirectional operation for the G2V and V2G functions in a broad voltage range is difficult without additional control due to the fixed turns ratio inherent in the existing OBC.

That is, an OBC/LDC integrated circuit according to the related art is limited in terms of raising/lowering voltage in the operations for Function I: G2V (grid-to-vehicle) and Function II: V2G (vehicle-to-grid) due to the fixed turns ratio and entails the problems of low efficiency and high complexity.

The operations for the G2V (grid-to-vehicle) and V2G (vehicle-to-grid) functions require the following properties.

I. Broad output voltage range in the G2V function

II. Control to Vdc=350 V for a broad input voltage range in the V2G function

To achieve all of the requirements above, additional control may be required:

(1) Boost control, to provide a turns ratio higher than 420/380, thereby ensuring a broad output voltage range in the G2V function, and to operate S5~S8 as a boost converter to achieve the goals for the V2G function at a low HVB voltage; and (2) Variable DC link voltage control, to provide a turns ratio lower than 300/350, for providing control such that Vdc=350 V over a broad input voltage range in the V2G function, and to change the DC link voltage according to the output voltage in order to ensure a broad output voltage range in the G2V function.

Also, for Function III: an LDC (low-voltage DC/DC converter), all twelve switches are used, with losses occurring at all of the switches.

There is also the problem of high loss at the front-end converter, due to hard switching, the use of high-frequency switches (for high efficiency in G2V), and high conduction loss.

Thus, there is a need for a charging system based on novel technology with that can reduce the size of the charging system to increase the power density and enable the charging of the high-voltage battery and the low-voltage auxiliary battery with a single circuit.

SUMMARY

The present disclosure has been conceived to resolve the problems found in the battery charging system for electric vehicles according to the related art and carries the objective of providing an OBC/LDC integrated circuit capable of implementing multiple functions and multiple turns ratios to enable bidirectional operation over a broad voltage range with a high power density and without additional control.

Another objective of the disclosure is to provide a multi-functional multi-ratio OBC/LDC integrated circuit that integrates the OBC and the LDC, so that the size of the charging system may be reduced and the power density may be increased, due to the high-voltage battery and the low-voltage auxiliary battery being charged by a single circuit, and the electric vehicle battery may be charged and maintained more efficiently.

Another objective of the disclosure is to provide a multi-functional multi-ratio OBC/LDC integrated circuit in which the functions of the LDC can be performed with just the circuit of the OBC without requiring an additional DC/DC converter, as to provide a reduced complexity of the circuit and reduced loss.

Another objective of the disclosure is to provide a multi-functional multi-ratio OBC/LDC integrated circuit with which the turns ratio can be used selectively, so that the G2V and V2G functions can be performed bidirectionally over a broad voltage range, and the LDC functions can be operated using only a small number of switches, so that the charging efficiency may be increased.

Another objective of the disclosure is to provide a multi-functional multi-ratio OBC/LDC integrated circuit that allows bidirectional operation over a broad voltage range in the G2V and V2G functions of the OBC, without additional control and with only the function of a simple synchronous rectifier, and provides high efficiency in the LDC function with the operation of only six switches.

The objectives of the disclosure are not limited to those mentioned above, and objectives other than those mentioned above would be clearly understood by the skilled person from the disclosure set forth below.

A multi-functional multi-ratio OBC/LDC integrated circuit according to an embodiment of the disclosure, conceived to achieve objectives such as the above, may include: a first switching unit that has a first, second, third, and fourth switch component $S_1$, $S_2$, $S_3$, $S_4$ forming a full bridge circuit and is connected to a grid by way of a first and second inductor $L_1$, $L_2$; a low-voltage battery (LVB) parallel connected to the first switching unit; a mode selection switch M configured to perform switching for connecting to a terminal (a) of the first switching unit or a terminal (b) of the low-voltage battery (LVB); a DC link capacitor $C_{dc}$ parallel connected to the low-voltage battery (LVB), a first and second capacitor $C_1$, $C_2$, series connected to each other and parallel connected to the DC link capacitor $C_{dc}$; a second switching unit that has a fifth and sixth switch component $S_5$, $S_6$ forming a half bridge circuit and is parallel connected to the DC link capacitor $C_{dc}$; a third switching unit having a seventh and an eighth switch component $S_7$, $S_8$ forming a half bridge circuit and is parallel connected to the second switching unit; a transformer circuit unit configured to perform a transforming operation with different turns ratios according to a switching operation of turns-ratio selection switches $M_1$, $M_2$, $M_3$; and a fourth switching unit that has a ninth, a tenth, an eleventh, and a twelfth switch component $S_9$, $S_{10}$, $S_{11}$, $S_{12}$ and is connected to the transformer circuit unit in correspondence to the second and third switching units to form a DC-DC converter; and a high-voltage battery (HVB) parallel connected to the fourth switching unit.

Here, the turns-ratio selection switch $M_1$ may be positioned between a common output terminal of the fifth switch component $S_5$ and the sixth switch component $S_6$, which form the second switching unit, and a first turns-ratio terminal of the transformer circuit unit, the turns-ratio selection switch $M_2$ may be positioned between a common output terminal of the first capacitor $C_1$ and the second capacitor $C_2$, which are connected to each other in series, and a second first turns-ratio terminal of the transformer circuit unit, and the turns-ratio selection switch $M_3$ may be positioned between a common output terminal of the seventh switch component $S_7$ and the eighth switch component $S_8$, which form the third switching unit, and a third first turns-ratio terminal of the transformer circuit unit.

A switching operation of the mode selection switch M and the turns-ratio selection switches $M_1$, $M_2$, $M_3$ may provide different turns ratios for a G2V (grid-to-vehicle) operation, a V2G (vehicle-to-grid) operation, and an LDC (low-voltage DC/DC converter) operation, where all three windings of a primary, a secondary, and a tertiary winding may be used during the G2V (grid-to-vehicle) operation, two windings of the primary and the tertiary windings may be used during the V2G (vehicle-to-grid) operation, and two windings of the primary and the secondary windings may be used during the LDC (low-voltage DC/DC converter) operation.

The G2V (grid-to-vehicle) operation may be performed with the mode selection switch M connected to the terminal (a) of the first switching unit, the turns-ratio selection switch $M_1$ and the turns-ratio selection switch $M_3$ in a closed state, and the turns-ratio selection switch $M_2$ in an open state; the V2G (vehicle-to-grid) operation may be performed with the mode selection switch M connected to the terminal (a) of the first switching unit, the turns-ratio selection switch $M_2$ and the turns-ratio selection switch $M_3$ in a closed state, and the turns-ratio selection switch $M_1$ in an open state; and the LDC (low-voltage DC/DC converter) operation may be performed with the mode selection switch M connected to the terminal (b) of the low-voltage battery (LVB), the turns-ratio selection switch $M_1$ and the turns-ratio selection switch $M_2$ in a closed state, and the turns-ratio selection switch $M_3$ in an open state.

During the G2V (grid-to-vehicle) operation, the first, second, third, and fourth switch components $S_1$, $S_2$, $S_3$, $S_4$ of the first switching unit may undergo a step-up PFC control, the fifth and sixth switch components $S_5$, $S_6$ of the second switching unit and the seventh and eighth switch components $S_7$, $S_8$ of the third switching unit may undergo a phase shift control, and the ninth, tenth, eleventh, and twelfth switch components $S_9$, $S_{10}$, $S_{11}$, $S_{12}$ of the fourth switching unit may undergo a synchronous rectifier control.

During the G2V (grid-to-vehicle) operation, the voltage of 220 Vrms may be raised to 380V by way of a PFC (power factor corrector) converter, the voltage of 380V may be raised to $380*N_p/(N_s+N_t)V$ (420V or higher) by way of a transformer, and the output voltage may be adjusted by way of an operation of a PSFB (phase-shifted full bridge) converter, the range of the output voltage being 300~420V During the V2G (vehicle-to-grid) operation, the ninth, tenth, eleventh, and twelfth switch components $S_9$, $S_{10}$, $S_{11}$, $S_{12}$ of the fourth switching unit may undergo a phase shift control, the seventh and eighth switch components $S_7$, $S_8$ of the third switching unit may undergo a synchronous rectifier control so as to maintain a DC link voltage over the input voltage range without additional control, and the first, second, third, and fourth switch components $S_1$, $S_2$, $S_3$, $S_4$ of the first switching unit may undergo a single-phase inverter control.

During the V2G (vehicle-to-grid) operation, the input voltage range may be 300~420V, $V_p$ may be lowered to $V_t = V_p * N_t / N_p$ by way of a transformer, $V_{dc}$ may be adjusted through a voltage of at most twice of $V_t$, the first and second capacitors $C_1$, $C_2$ may maintain a voltage of $V_{dc}/2 = 175V$ by way of a FB-HB (full bridge-half bridge) converter, and the output voltage may be 220 Vrms.

During the LDC (low-voltage DC/DC converter) operation, the ninth, tenth, eleventh, and twelfth switch components $S_9$, $S_{10}$, $S_{11}$, $S_{12}$ of the fourth switching unit may undergo a phase shift control, and the fifth and sixth switch components $S_5$, $S_6$ of the second switching unit may undergo a synchronous rectifier control.

During the LDC (low-voltage DC/DC converter) operation, the input voltage range may be 300~420V, $V_p$ may be lowered to $V_s = V_p * N_s / N_p$ by way of a transformer, $V_o$ may be adjusted to 24V through a voltage of at most twice of $V_s$, the first and second capacitors $C_1$, $C_2$ may maintain $V_o/2 = 12V$ by way of a HB-FB (half bridge-full bridge) converter, and the output voltage may be maintained at 24V.

A multi-functional multi-ratio OBC/LDC integrated circuit according to an embodiment of the disclosure described above can provide the following advantages.

First, the circuit can be operated bidirectionally over a broad voltage range with a high power density and without additional control.

Second, as the OBC and the LDC are integrated and the high-voltage battery and the low-voltage auxiliary battery can be charged with a single circuit, the size of the charging system can be reduced, whereby the batteries for an electric vehicle may be charged and maintained with an increased power density and higher efficiency.

Third, with the OBC/LDC integrated circuit, even the LDC function can be performed with just the circuit of the OBC without an additional DC/DC converter, so that the complexity and loss of the circuit can be reduced.

Fourth, as the turns ratio can be used selectively, the G2V and V2G functions can be performed bidirectionally over a broad voltage range without additional control, and the LDC function can be operated by using only a small number of switches, so that the efficiency of the charging control can be increased.

DETAILED DESCRIPTION

Amore detailed description is provided below of an OBC/LDC integrated circuit capable of implementing multiple functions and multiple turns ratios according to certain embodiments of the disclosure.

The features and advantages of a multi-functional multi-ratio OBC/LDC integrated circuit based on the present disclosure will be made apparent from the detailed descriptions of each embodiment set forth below.

Figure 1A:
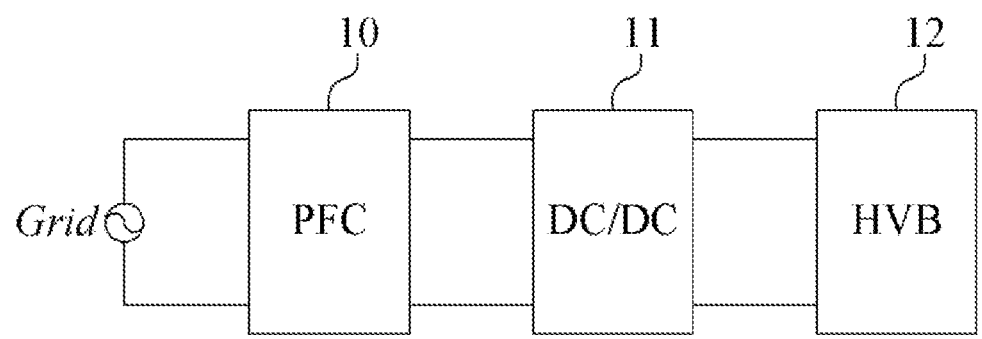
FIG. 1A and FIG. 1B are a block diagram and a circuit diagram illustrating the composition of a general OBC.
Figure 1B:
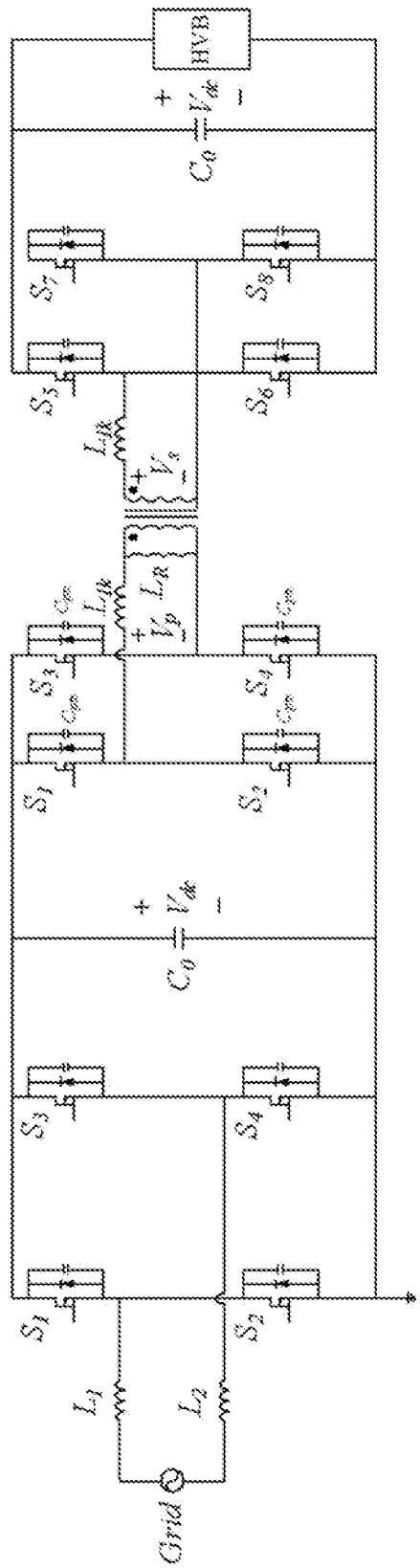
Figure 2A:
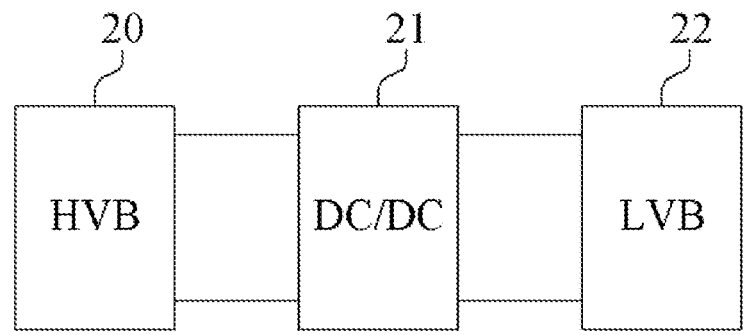
FIG. 2A and FIG. 2B are a block diagram and a circuit diagram illustrating the composition of a general LDC.
Figure 2B:
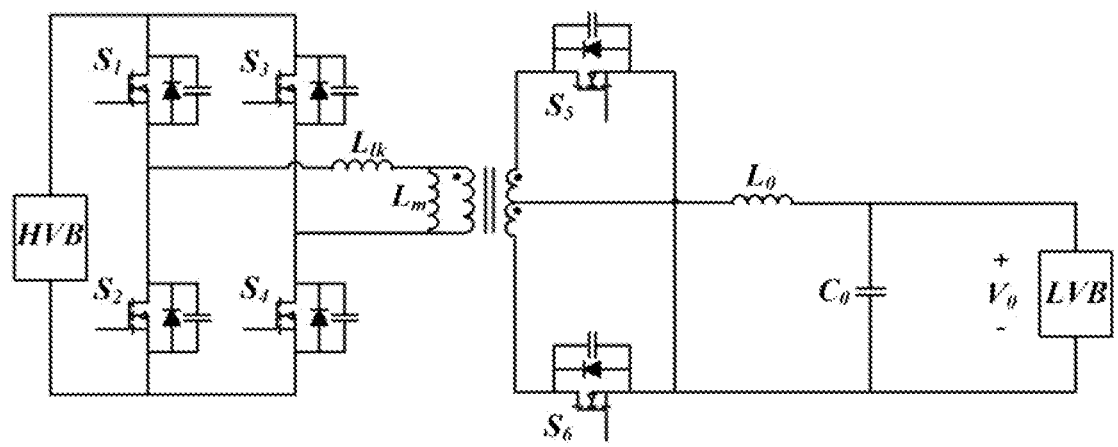
Figure 3:
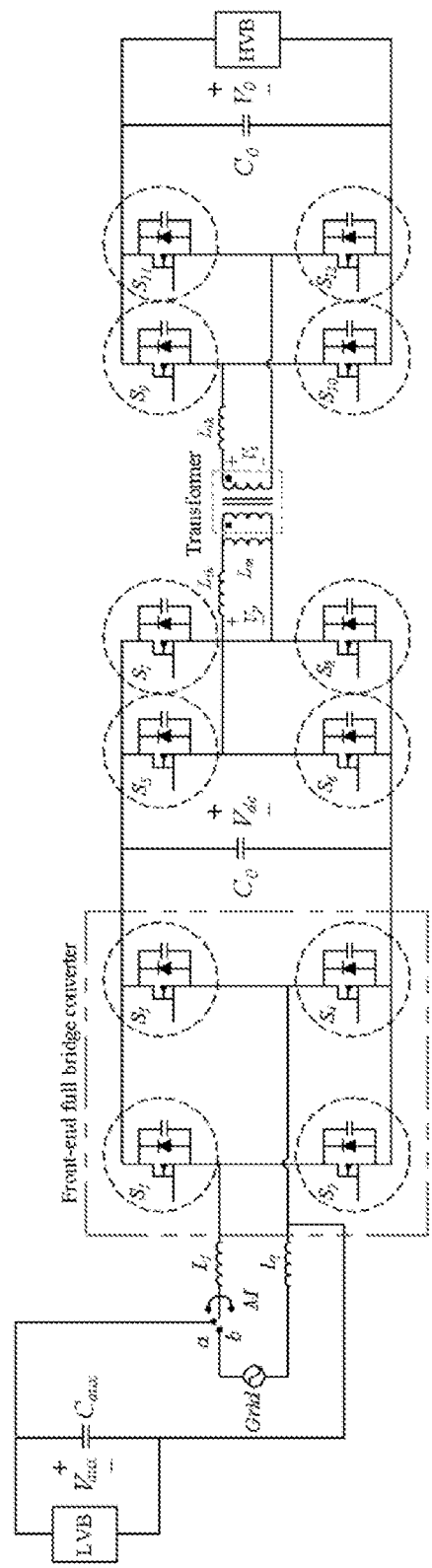
FIG. 3 is a circuit diagram illustrating an OBC/LDC integrated circuit according to the related art.
Figure 4:
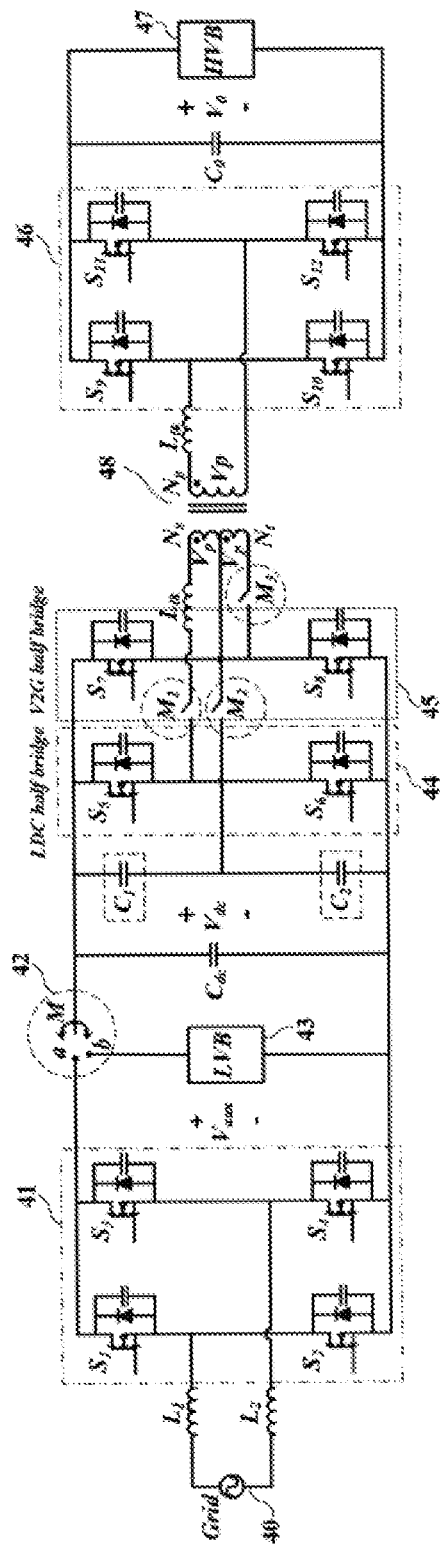
FIG. 4 is a circuit diagram illustrating a multi-functional multi-ratio OBC/LDC integrated circuit according to an embodiment of the disclosure.

FIG. 4 is a circuit diagram illustrating a multi-functional multi-ratio OBC/LDC integrated circuit according to an embodiment of the disclosure.

A multi-functional multi-ratio OBC/LDC integrated circuit based on the present disclosure has the OBC and the LDC integrated, and as the high-voltage battery and the low-voltage auxiliary battery may be charged with a single circuit, the size of the charging system can be reduced, the power density can be increased, and the battery of the electric vehicle can be charged and managed with greater efficiency.

An embodiment of the disclosure forms an OBC/LDC integrated circuit, in which the LDC function can be performed with only the circuit of the OBC without requiring an additional DC/DC converter, the turns ratio can be used selectively to perform G2V and V2G functions bidirectionally over a broad voltage range without additional control, and the LDC function can be operated with the use of only a small number of switches for increased charging efficiency.

In the descriptions below, the G2V (grid-to-vehicle) function, also referred to as Function I, is a function for charging the high-voltage battery (HVB) from the grid; the V2G (vehicle-to-grid) function, also referred to as Function II, is a function for transmitting power from the high-voltage battery (HVB) to the grid; and the LDC (low-voltage DC/DC converter) function, also referred to as Function III, is a function for charging the low-voltage battery from the high-voltage battery.

A multi-functional multi-ratio OBC/LDC integrated circuit according to an embodiment of the disclosure, as shown in FIG. 4, may include a first switching unit 41 that has a first, second, third, and fourth switch component $S_1$, $S_2$, $S_3$, $S_4$ forming a full bridge circuit and is connected to the grid 40 through a first and a second inductor $L_1$, $L_2$, a low-voltage battery (LVB) 43 parallel connected to the first switching unit 41, a mode selection switch (M) 42 that performs switching to connect selectively to a terminal (a) of the first switching unit 41 or a terminal (b) of the low-voltage battery 43, a DC link capacitor $C_{dc}$ parallel connected to the low-voltage battery 43, a first and second capacitor $C_1$, $C_2$ that are connected in series to each other and connected in parallel to the DC link capacitor $C_{dc}$ a second switching unit 44 that has a fifth and sixth switch component $S_5$, $S_6$ forming a half bridge circuit and is parallel connected to the DC link capacitor $C_{dc}$, a third switching unit 45 that has a seventh and an eighth switch component $S_7$, $S_8$ forming a half bridge circuit and is parallel connected to the second switching unit 44, a transformer circuit unit 48 that performs a transforming operation with different turns ratios for G2V (grid-to-vehicle) operation, V2G (vehicle-to-grid) operation, and LDC (low-voltage DC/DC converter) operation according to the switching operation of turns-ratio selection switches $M_1$, $M_2$, $M_3$, a fourth switching unit 46 that has a ninth, tenth, eleventh, and twelfth switch component $S_9$, $S_{10}$, $S_{11}$, $S_{12}$ and is connected to the transformer circuit unit 48 in correspondence to the second and third switching units 44, 45 to form a DC-DC converter, and a high-voltage battery (HVB) 47 parallel connected to the fourth switching unit 46.

Here, the turns-ratio selection switch $M_1$ may be connected with the common output terminal of the fifth switch component $S_5$ and sixth switch component $S_6$, which form the second switching unit 44, and with a first turns-ratio terminal of the transformer circuit unit 48; the turns-ratio selection switch $M_2$ may be connected with the common output terminal of the first capacitor $C_1$ and second capacitor $C_2$, which are series connected to each other, and with a second turns-ratio terminal of the transformer circuit unit 48; and the turns-ratio selection switch $M_3$ may be connected with the common output terminal of the seventh switch component $S_7$ and eighth switch component $S_8$, which form the third switching unit 45, and with a third turns-ratio terminal of the transformer circuit unit 48.

As in FIG. 4, the mode selection switch (M) 42 may be formed at a position for parallel connecting the terminal (a) of the first switching unit 41 or the terminal (b) of the low-voltage battery 43 to the DC link capacitor $C_{dc}$, and the turns-ratio selection switches $M_1$, $M_2$, $M_3$ may be formed to provide a transforming operation with different turns ratios for G2V (grid-to-vehicle) operation, V2G (vehicle-to-grid) operation, and LDC (low-voltage DC/DC converter) operation according to the switching operation.

To maintain the magnitude of the DC link capacitance, the DC link capacitor Ca, and the first and second capacitors $C_1$, $C_2$ that are series connected to each other and parallel connected to the DC link capacitor $C_{dc}$ may be provided.

The OBC/LDC integrated circuit having multiple functions and multiple turns ratios according to an embodiment of the disclosure may use all three of the primary, secondary, and tertiary windings during the G2V (grid-to-vehicle) operation of [Function I].

During the V2G (vehicle-to-grid) operation of [Function II], only two windings, the primary and tertiary windings may be used.

During the V2G (vehicle-to-grid) operation of [Function II], the seventh, eighth, ninth, tenth, eleventh, and twelfth switch components $S_7$, $S_8$, $S_9$, $S_{10}$, $S_{11}$, $S_{12}$ may form a FB-HB (full bridge-half bridge) DC/DC converter and may allow operation over a broad input voltage range without an additional control procedure.

During the LDC (low-voltage DC/DC converter) operation of [Function III], only two windings, the primary and secondary windings may be used, where the fifth, sixth, ninth, tenth, eleventh, and twelfth switch components $S_5$, $S_6$, $S_9$, $S_{10}$, $S_{11}$, $S_{12}$ may form a FB-HB (full bridge-half bridge) DC/DC converter, and the voltages of the first and second capacitors $C_1$, $C_2$ may maintain $V_{aux}/2=V_s$.

Thus, a multi-functional multi-ratio OBC/LDC integrated circuit according to an embodiment of the disclosure can perform all three functions with a smaller number of switches compared to the non-integrated separated type circuit.

As regards the operation process, in the first G2V function, the mode selection switch (M) 42 may be connected to the terminal (a) of the first switching unit 41, and the circuit may operate with the turns-ratio selection switch $M_1$ and the turns-ratio selection switch $M_3$ in a closed state and the turns-ratio selection switch $M_2$ in an open state. Here, all three turns ratios may be used, operating in the same manner as in a conventional integrated type circuit.

In the second V2G function, the mode selection switch (M) 42 may be connected to the terminal (a) of the first switching unit 41, and the circuit may operate with the turns-ratio selection switch $M_2$ and the turns-ratio selection switch $M_3$ in a closed state and the turns-ratio selection switch $M_1$ in an open state.

Here, the turns ratios of the DC/DC converter may use only two of the three turns ratios, $N_p$ and $N_t$, to operate as a DC/DC converter that has the front end formed in a full bridge configuration and the back end formed in a half bridge configuration.

Here, the seventh and eighth switch components $S_7$, $S_8$ forming the back end may operate with only the control of the synchronous rectifier.

In this way, the drawback of bidirectional operation being impossible over a broad voltage range with only the simple role of the synchronous rectifier without additional control due to a fixed turns ratio may be improved.

In the third LDC function, the mode selection switch (M) 42 may be connected to the terminal (b) of the low-voltage battery 43, and the circuit may operate with the turns-ratio selection switch $M_1$ and the turns-ratio selection switch $M_2$ in a closed state and the turns-ratio selection switch $M_3$ in an open state.

In this function also, only two turns ratios, $N_p$ and $N_s$, may be used, to operate as a DC/DC converter that has the front end formed in a full bridge configuration and the back end formed in a half bridge configuration.

Whereas an integrated type circuit based on the related art would perform the LDC operation through twelve switches, the multi-functional multi-ratio OBC/LDC integrated circuit according to an embodiment of the disclosure may operate through six switches, thus providing increased efficiency.

The details of the G2V (grid-to-vehicle) operation, V2G (vehicle-to-grid) operation, and LDC (low-voltage DC/DC converter) operation are as follows.

Figure 5:
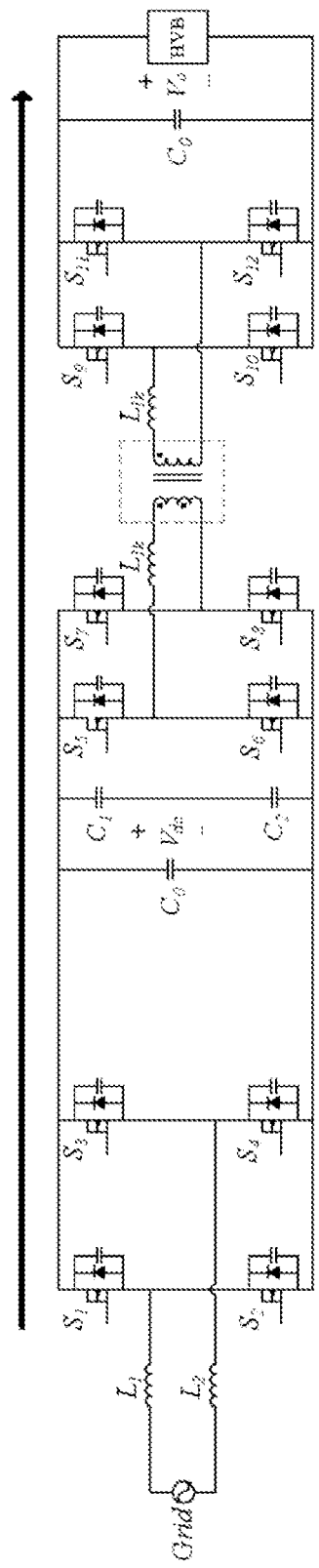
FIG. 5, FIG. 6, and FIG. 7 are diagrams illustrating the operation of a multi-functional multi-ratio OBC/LDC integrated circuit according to an embodiment of the disclosure under different modes.
Figure 6:
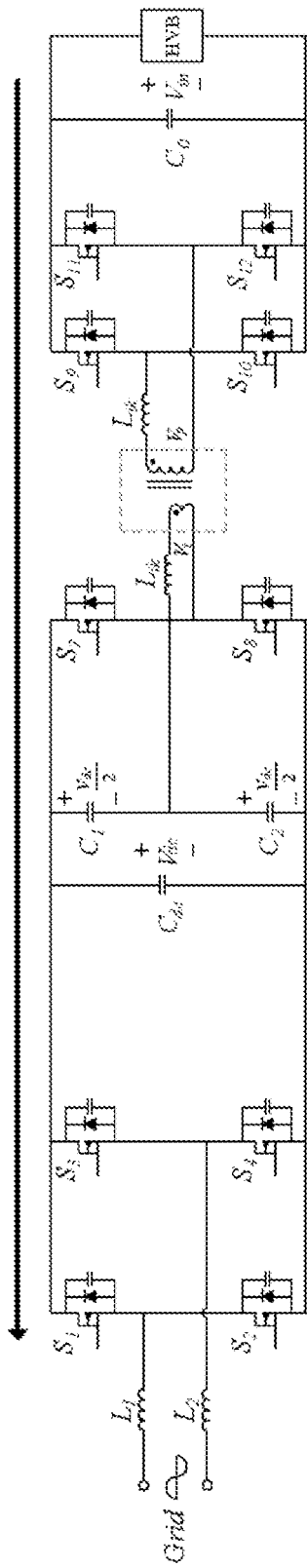
Figure 7:
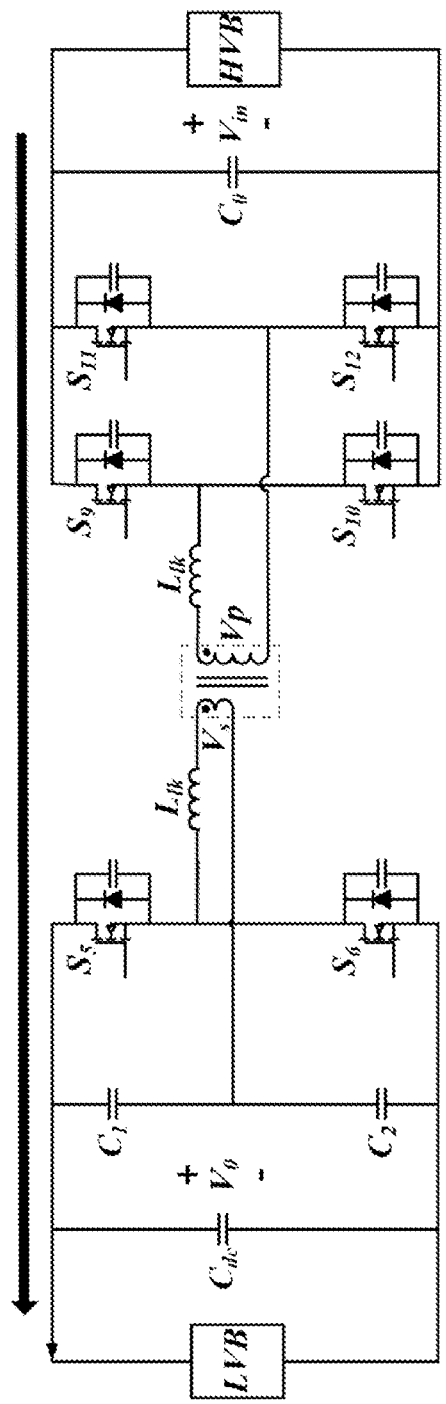

FIGS. 5 to 7 are diagrams illustrating the operation of a multi-functional multi-ratio OBC/LDC integrated circuit according to an embodiment of the disclosure under different modes.

FIG. 5 illustrates the G2V (grid-to-vehicle) operation of [Function I].

The G2V (grid-to-vehicle) operation may begin with the mode selection switch (M) 42 connected to the terminal (a) of the first switching unit 41, the turns-ratio selection switch $M_1$ and the turns-ratio selection switch $M_3$ in a closed state, and the turns-ratio selection switch $M_2$ in an open state.

By way of a PFC (power factor corrector) converter, the 220 Vrms may be raised to 380V, and by way of the transformer, the 380V may be raised to $380*N_p/(N_s+N_t)$V (420V or higher).

Through the operation of the PSFB (phase-shifted full bridge) converter, the output voltage may be adjusted, the range of the output voltage being 300~420V.

The control for the G2V (grid-to-vehicle) operation may involve the step-up PFC control for the first, second, third, and fourth switch components $S_1$, $S_2$, $S_3$, $S_4$ of the first switching unit 41, the phase shift control for the fifth and sixth switch components $S_5$, $S_6$ of the second switching unit 44 and the seventh and eighth switch components of the third switching unit 45, and the synchronous rectifier control for the ninth, tenth, eleventh, and twelfth switch components $S_9$, $S_{10}$, $S_{11}$, $S_{12}$ of the fourth switching unit 46.

FIG. 6 illustrates the V2G (vehicle-to-grid) operation of [Function II].

The V2G (vehicle-to-grid) operation may begin with the mode selection switch (M) 42 connected to the terminal (a) of the first switching unit 41, the turns-ratio selection switch $M_2$ and the turns-ratio selection switch $M_3$ in a closed state, and the turns-ratio selection switch $M_1$ in an open state.

The input voltage range may be 300~420V, and a transformer may be used to lower $V_p$ to $V_t = V_p * N_t/N_p$, where $V_{dc}$ can be adjusted through a voltage of at most twice the value of $V_t$.

By way of a FB-HB (full bridge-half bridge) converter, the first and second capacitors $C_1$, $C_2$ may maintain a voltage of $V_{dc}/2 = 175V$, and the output voltage may be 220 Vrms.

The ninth, tenth, eleventh, and twelfth switch components $S_9$, $S_{10}$, $S_{11}$, $S_{12}$ of the fourth switching unit 46 may undergo a phase shift control, and the seventh and eighth switch components $S_7$, $S_8$ of the third switching unit 45 may undergo a synchronous rectifier control, so that the DC link voltage of 350V can be maintained over a broad input voltage range without additional control.

The first, second, third, and fourth switch components $S_1$, $S_2$, $S_3$, $S_4$ of the first switching unit 41 may undergo a single-phase inverter control.

An embodiment of disclosure thus does not require additional control such as variable DC link control, boost control, etc., during the V2G (vehicle-to-grid) operation of [Function II] and can operate for a broad range of input voltages without additional control while providing increased efficiency according to simulations.

FIG. 7 illustrates the LDC (low-voltage DC/DC converter) operation of [Function III].

The LDC operation may begin with the mode selection switch (M) 42 connected to the terminal (b) of the first switching unit 41, the turns-ratio selection switch $M_1$ and the turns-ratio selection switch $M_2$ in a closed state, and the turns-ratio selection switch $M_3$ in an open state.

The input voltage range may be 300~420V, and a transformer may be used to lower $V_p$ to $V_s = V_p * N_s/N_p$, where $V_o$ can be adjusted to 24V through a voltage twice the value of $V_s$.

By way of a HB-FB (half bridge-full bridge) converter, the first and second capacitors $C_1$, $C_2$ may maintain VW/2=12V, and the output voltage may be maintained at 24V.

The ninth, tenth, eleventh, and twelfth switch components $S_9$, $S_{10}$, $S_{11}$, $S_{12}$ of the fourth switching unit 46 may undergo a phase shift control, and the fifth and sixth switch components $S_5$, $S_6$ of the second switching unit 44 may undergo a synchronous rectifier control, so that additional control such as buck control, etc., is unnecessary, and the LDC operation can be performed without additional control and components, while providing increased efficiency according to simulations.

The multi-functional multi-ratio OBC/LDC integrated circuit according to an embodiment of the disclosure described above forms an OBC/LDC integrated circuit, where the LDC function can be performed with only the circuit of the OBC, the turns ratio can be used selectively to perform both the G2V and V2G functions bidirectionally over a broad range of voltages without additional control, and the charging efficiency can be increased by using only a small number of switches for the LDC function.

It is to be appreciated that the disclosure can be implemented in different variations without departing from the essential properties of the disclosure set forth above. Therefore, the embodiments disclosed herein must be considered not as limiting but rather describing the disclosure. The scope of the disclosure is set forth not in the descriptions above but in the scope of claims, where any differences that fall within the scope of equivalency shall be interpreted as being encompassed within the scope of the disclosure.

What is claimed is:

1. A multi-functional multi-ratio OBC/LDC integrated circuit comprising:
   a first switching unit having a first, a second, a third, and a fourth switch component $(S_1)(S_2)(S_3)(S_4)$ and connected to a grid by way of a first and a second inductor $(L_1)(L_2)$, the first, second, third, and fourth switch components $(S_1)(S_2)(S_3)(S_4)$ forming a full bridge circuit;
   a low-voltage battery (LVB) parallel connected to the first switching unit;
   a mode selection switch (M) configured to perform switching for connecting to a terminal (a) of the first switching unit or a terminal (b) of the low-voltage battery (LVB);
   a DC link capacitor $(C_{dc})$ and a first and a second capacitor $(C_1)(C_2)$, the DC link capacitor $(C_{dc})$ parallel connected to the low-voltage battery (LVB), the first and second capacitors $(C_1)(C_2)$ series connected to each other and parallel connected to the DC link capacitor $(C_{dc})$;
   a second switching unit having a fifth and a sixth switch component $(S_5)(S_6)$ and parallel connected to the DC link capacitor $(C_{dc})$, the fifth and sixth switch components $(S_5)(S_6)$ forming a half bridge circuit;
   a third switching unit having a seventh and an eighth switch component $(S_7)(S_8)$ and parallel connected to the second switching unit, the seventh and eighth switch components $(S_7)(S_8)$ forming a half bridge circuit;
   a transformer circuit unit configured to perform a transforming operation with different turns ratios according to a switching operation of turns-ratio selection switches including first, second, and third turns-ratio selection switches $(M_1)(M_2)(M_3)$; and
   a fourth switching unit having a ninth, a tenth, an eleventh, and a twelfth switch component $(S_9)(S_{10})(S_{11})(S_{12})$ and connected to the transformer circuit unit in correspondence to the second and the third switching units to form a DC-DC converter; and
   a high-voltage battery (HVB) parallel connected to the fourth switching unit.

2. The multi-functional multi-ratio OBC/LDC integrated circuit of claim 1, wherein the first turns-ratio selection switch $(M_1)$ is positioned between a common output terminal of the fifth switch component $(S_5)$ and the sixth switch component $(S_6)$ forming the second switching unit and a first turns-ratio terminal of the transformer circuit unit,
   the second turns-ratio selection switch $(M_2)$ is positioned between a common output terminal of the first capacitor $(C_1)$ and the second capacitor $(C_2)$ connected to each other in series and a second first turns-ratio terminal of the transformer circuit unit, and
   the third turns-ratio selection switch $(M_3)$ is positioned between a common output terminal of the seventh switch component $(S_7)$ and the eighth switch component $(S_8)$ forming the third switching unit and a third first turns-ratio terminal of the transformer circuit unit.

3. The multi-functional multi-ratio OBC/LDC integrated circuit of claim 1, wherein a switching operation of the mode selection switch (M) and the first, second, and third turns-ratio selection switches $(M_1)(M_2)(M_3)$ provides different turns ratios for a G2V (grid-to-vehicle) operation, a V2G (vehicle-to-grid) operation, and an LDC (low-voltage DC/DC converter) operation,
   all three windings of a primary, a secondary, and a tertiary winding are used during the G2V (grid-to-vehicle) operation, two windings of the primary and the tertiary windings are used during the V2G (vehicle-to-grid) operation, and two windings of the primary and the secondary windings are used during the LDC (low-voltage DC/DC converter) operation.

4. The multi-functional multi-ratio OBC/LDC integrated circuit of claim 3, wherein the G2V (grid-to-vehicle) operation is performed with the mode selection switch (M) connected to the terminal (a) of the first switching unit, the first turns-ratio selection switch ($M_1$) and the third turns-ratio selection switch ($M_3$) in a closed state, and the second turns-ratio selection switch ($M_2$) in an open state, the V2G (vehicle-to-grid) operation is performed with the mode selection switch (M) connected to the terminal (a) of the first switching unit, the second turns-ratio selection switch ($M_2$) and the third turns-ratio selection switch ($M_3$) in a closed state, and the first turns-ratio selection switch ($M_1$) in an open state, and the LDC (low-voltage DC/DC converter) operation is performed with the mode selection switch (M) connected to the terminal (b) of the low-voltage battery (LVB), the first turns-ratio selection switch ($M_1$) and the second turns-ratio selection switch ($M_2$) in a closed state, and the third turns-ratio selection switch ($M_3$) in an open state.

5. The multi-functional multi-ratio OBC/LDC integrated circuit of claim 4, wherein, during the G2V (grid-to-vehicle) operation, the first, the second, the third, and the fourth switch components ($S_1$)($S_2$)($S_3$)($S_4$) of the first switching unit undergo a step-up PFC control, the fifth and the sixth switch components ($S_5$)($S_6$) of the second switching unit and the seventh and the eighth switch components ($S_7$)($S_8$) of the third switching unit undergo a phase shift control, and the ninth, the tenth, the eleventh, and the twelfth switch components ($S_9$)($S_{10}$)($S_{11}$)($S_{12}$) of the fourth switching unit undergo a synchronous rectifier control.

6. The multi-functional multi-ratio OBC/LDC integrated circuit of claim 4, wherein, during the G2V (grid-to-vehicle) operation, a voltage of 220 Vrms is raised to 380V by way of a PFC (power factor corrector) converter, the voltage of 380V is raised to $380*N_p/(N_s+N_t)$V by way of a transformer, and an output voltage is adjusted by way of an operation of a PSFB (phase-shifted full bridge) converter, a range of the output voltage being 300~420V.

7. The multi-functional multi-ratio OBC/LDC integrated circuit of claim 4, wherein, during the V2G (vehicle-to-grid) operation, the ninth, the tenth, the eleventh, and the twelfth switch components ($S_9$)($S_{10}$)($S_{11}$)($S_{12}$) of the fourth switching unit undergo a phase shift control, the seventh and the eighth switch components ($S_7$)($S_8$) of the third switching unit undergo a synchronous rectifier control so as to maintain a DC link voltage over an input voltage range without additional control, and the first, the second, the third, and the fourth switch components ($S_1$)($S_2$)($S_3$)($S_4$) of the first switching unit undergo a single-phase inverter control.

8. The multi-functional multi-ratio OBC/LDC integrated circuit of claim 4, wherein, during the V2G (vehicle-to-grid) operation, an input voltage range is 300~420V, $V_p$ is lowered to $V_t=V_p*N_t/N_p$ by way of a transformer, $V_{dc}$ is adjusted through a voltage of at most twice of $V_t$, the first and the second capacitors ($C_1$)($C_2$) maintain a voltage of $V_{dc}/2=175V$ by way of a FB-HB (full bridge-half bridge) converter, and the output voltage is 220 Vrms.

9. The multi-functional multi-ratio OBC/LDC integrated circuit of claim 4, wherein, during the LDC (low-voltage DC/DC converter) operation, the ninth, the tenth, the eleventh, and the twelfth switch components ($S_9$)($S_{10}$)($S_{11}$)($S_{12}$) of the fourth switching unit undergo a phase shift control, and the fifth and the sixth switch components ($S_5$)($S_6$) of the second switching unit undergo a synchronous rectifier control.

10. The multi-functional multi-ratio OBC/LDC integrated circuit of claim 4, wherein, during the LDC (low-voltage DC/DC converter) operation, an input voltage range is 300~420V, $V_p$ is lowered to $V_s=V_p*N_s/N_p$ by way of a transformer, $V_o$ is adjusted to 24V through a voltage of at most twice of $V_s$, the first and the second capacitors ($C_1$)($C_2$) maintain $V_o/2=12V$ by way of a HB-FB (half bridge-full bridge) converter, and an output voltage is maintained at 24V.

11. The multi-functional multi-ratio OBC/LDC integrated circuit of claim 5, wherein, during the G2V (grid-to-vehicle) operation, a voltage of 220 Vrms is raised to 380V by way of a PFC (power factor corrector) converter, the voltage of 380V is raised to $380*N_p/(N_s+N_t)$V by way of a transformer, and an output voltage is adjusted by way of an operation of a PSFB (phase-shifted full bridge) converter, a range of the output voltage being 300~420V.

12. The multi-functional multi-ratio OBC/LDC integrated circuit of claim 7, wherein, during the V2G (vehicle-to-grid) operation, an input voltage range is 300~420V, $V_p$ is lowered to $V_t=V_p*N_t/N_p$ by way of a transformer, $V_{dc}$ is adjusted through a voltage of at most twice of $V_t$, the first and the second capacitors ($C_1$)($C_2$) maintain a voltage of $V_{dc}/2=175V$ by way of a FB-HB (full bridge-half bridge) converter, and the output voltage is 220 Vrms.

13. The multi-functional multi-ratio OBC/LDC integrated circuit of claim 9, wherein, during the LDC (low-voltage DC/DC converter) operation, an input voltage range is 300~420V, $V_p$ is lowered to $V_s=V_p*N_s/N_p$ by way of a transformer, $V_o$ is adjusted to 24V through a voltage of at most twice of $V_s$, the first and the second capacitors ($C_1$)($C_2$) maintain $V_o/2=12V$ by way of a HB-FB (half bridge-full bridge) converter, and an output voltage is maintained at 24V.

* * * * *